US008698837B2

(12) United States Patent
Kilgard

(10) Patent No.: US 8,698,837 B2
(45) Date of Patent: Apr. 15, 2014

(54) PATH RENDERING WITH PATH CLIPPING

(75) Inventor: Mark J. Kilgard, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 267 days.

(21) Appl. No.: 13/110,777

(22) Filed: May 18, 2011

(65) Prior Publication Data
US 2011/0285740 A1 Nov. 24, 2011

Related U.S. Application Data

(60) Provisional application No. 61/347,359, filed on May 21, 2010.

(51) Int. Cl.
G09G 5/02 (2006.01)
(52) U.S. Cl.
USPC ........... 345/620; 345/589; 345/622; 345/623; 345/625; 345/626; 345/629
(58) Field of Classification Search
USPC .......... 345/589, 620, 622, 623, 625, 626, 629
See application file for complete search history.

(56) References Cited

U.S. PATENT DOCUMENTS

| 5,731,820 | A | | 3/1998 | Broekhuijsen |
| 5,774,133 | A | * | 6/1998 | Neave et al. ................ 345/505 |
| 5,818,459 | A | | 10/1998 | Kurumida |
| 6,137,500 | A | | 10/2000 | Silverbrook et al. |
| 6,201,549 | B1 | | 3/2001 | Bronskill |
| 6,271,861 | B1 | | 8/2001 | Sargent et al. |
| 6,295,072 | B1 | | 9/2001 | Pon et al. |
| 6,384,822 | B1 | | 5/2002 | Bilodeau et al. |
| 6,819,332 | B2 | | 11/2004 | Baldwin |
| 7,167,181 | B2 | | 1/2007 | Duluk et al. |
| 7,184,040 | B1 | | 2/2007 | Tzvetkov |
| 7,355,602 | B1 | * | 4/2008 | Kilgard et al. ................ 345/559 |

(Continued)

FOREIGN PATENT DOCUMENTS

GB 2463993 4/2010

OTHER PUBLICATIONS

Farouki, et al. "Algebraic properties of plane offset curves", Elsevier Science Publishers B.V. (North-Holland) 1990, pp. 101-127.

(Continued)

*Primary Examiner* — Xioa M. Wu
*Assistant Examiner* — Todd Buttram
(74) *Attorney, Agent, or Firm* — Patterson + Sheridan, L.L.P.

(57) ABSTRACT

One embodiment of the present invention sets forth a technique for rendering clipped paths by first generating clip stencil buffer state indicating pixels that are inside of the clip path. The clip stencil buffer state may also store an opacity value for each covered pixel to generate a mask that modulates the opacity of a draw path that is clipped. Clipped draw stencil buffer state is then generated indicating pixels of the draw path that should be covered based on the clip stencil buffer state and coverage of the draw path. The clipped draw path is then filled or stroked to produce the clipped draw path. The clip and draw paths may be filled or stroked without tessellating the paths. Path rendering may be accelerated when a GPU or other processor that is configured to perform operations to generate the clip stencil buffer state and the clipped draw stencil buffer state, and to fill or stroke the clipped draw path.

20 Claims, 11 Drawing Sheets

(56) References Cited

U.S. PATENT DOCUMENTS

| | | | |
|---|---|---|---|
| 7,403,208 B1 | 7/2008 | Bastos et al. | |
| 7,408,553 B1 | 8/2008 | Toksvig et al. | |
| 7,499,055 B2 | 3/2009 | Lin et al. | |
| 7,589,730 B1 | 9/2009 | Brown | |
| 7,684,641 B1 * | 3/2010 | Toksvig | 382/274 |
| 7,737,983 B2 | 6/2010 | Brothers et al. | |
| 7,847,798 B1 * | 12/2010 | Parenteau et al. | 345/422 |
| 7,868,887 B1 | 1/2011 | Yhann | |
| 7,872,648 B2 | 1/2011 | Hoppe et al. | |
| 7,928,984 B1 | 4/2011 | Yhann et al. | |
| 8,044,955 B1 | 10/2011 | Yhann | |
| 8,044,956 B1 | 10/2011 | Kilgard | |
| 8,063,914 B1 | 11/2011 | Miller et al. | |
| 8,072,452 B1 | 12/2011 | Brown | |
| 8,264,503 B1 | 9/2012 | Parenteau et al. | |
| 8,379,025 B1 | 2/2013 | Carr et al. | |
| 2002/0075492 A1 | 6/2002 | Lee | |
| 2002/0194436 A1 | 12/2002 | McKenney et al. | |
| 2003/0164842 A1 | 9/2003 | Oberoi et al. | |
| 2004/0233195 A1 | 11/2004 | Bunnell | |
| 2006/0232603 A1 | 10/2006 | Schuster et al. | |
| 2007/0109318 A1 | 5/2007 | Tuomi | |
| 2007/0211061 A1 | 9/2007 | Kokojima | |
| 2008/0122866 A1 | 5/2008 | Dorbie et al. | |
| 2008/0198168 A1 * | 8/2008 | Jiao et al. | 345/506 |
| 2010/0002003 A1 * | 1/2010 | Yamauchi | 345/441 |
| 2010/0097382 A1 | 4/2010 | Nystad et al. | |
| 2010/0097383 A1 | 4/2010 | Nystad et al. | |
| 2010/0097388 A1 | 4/2010 | Nystad et al. | |
| 2010/0110093 A1 | 5/2010 | Nystad et al. | |
| 2010/0149181 A1 | 6/2010 | Lee et al. | |
| 2010/0185949 A1 | 7/2010 | Jaeger | |
| 2010/0225660 A1 * | 9/2010 | Robart | 345/589 |
| 2011/0090228 A1 | 4/2011 | Persson | |

OTHER PUBLICATIONS

Warnock, et al. "A Device Independent Graphics Imaging Model for Use with Raster Devices", Computer Graphics vol. 16, No. 3, Jul. 1982, pp. 313-319.

Loop, et al. "Resolution Independent Curve Rendering using Programmable Graphics Hardware", Association for Computing Machinery, Inc., 2005, pp. 1000-1009.

Kokojima, et al. "Resolution Independent Rendering of Deformable Vector Objects using Graphics Hardware", Toshiba Corp. (email: yoshiyuki.kokojima@toshiba.co.jp), one page, 2006.

Rueda, at al. "GPU-based rendering of curved polygons using simplicial coverings" Elsevier Computers & Graphics Journal 32, 2008 pp. 581-588.

Non-Final Office Action for U.S. Appl. No. 13/097,483 dated Jun. 14, 2013.

Benstead, Luke, et al., "Beginning OpenGL Game Programming, Second Edition," Mar. 13, 2009, Course Technology PTR, pp. 245-249.

Non-Final Office Action for U.S. Appl. No. 13/097,993 dated May 30, 2013.

Nehab, Diego, and Hugues Hoppe. "Random-access rendering of general vector graphics." ACM Transactions on Graphics (TOG). vol. 27. No. 5, ACM, 2008.

Non-Final Office Action for U.S. Appl. No. 13/080,948 dated Dec. 17, 2012.

Lee, et al. "Bezier Curve-based Approach to Shape Description for Chinese Calligraphy Characters". 2001.IEEE.

Blinn, Jim. "Jim Blinn's Corner Notation, Notation, Notation". 2003, Elsevier Inc. Chapter 16, p. 219-229.

Stone, Maureen C., DeRose, Tony D. "Geometric Characterization of Parametric Cubic Curves". ACM Transactions on Graphics, vol. 8, No. 3, Jul. 1989, p. 147-163.

Non-Final Office Action for U.S. Appl. No. 13/098,102 dated Dec. 19, 2012.

Final Office Action for U.S. Appl. No. 13/098,102 dated Feb. 13, 2013.

Advisory Action for U.S. Appl. No. 13/098,102 dated May 21, 2013.

Non-Final Office Action for U.S. Appl. No. 13/098,102 dated Oct. 11, 2013.

Non-Final Office Action for U.S. Appl. No. 13/111,897 dated Jul. 29, 2013.

Non-Final Office Action for U.S. Appl. No. 13/111,148 dated Jun. 4, 2013.

Non-Final Office Action for U.S. Appl. No. 13/081,325 dated Dec. 18, 2012.

Non-Final Office Action for U.S. Appl. No. 13/098,147 dated Dec. 19, 2012.

Final Office Action for U.S. Appl. No. 13/098,147 dated Apr. 18, 2013.

Non-Final Office Action for U.S. Appl. No. 13/112,874 dated Apr. 8, 2013.

Final Office Action for U.S. Appl. No. 13/112,874 dated Aug. 1, 2013.

Advisory Action for U.S. Appl. No. 13/112,874 dated Oct. 10, 2013.

Wikipedia, Blend Modes.

Non-Final Office Action for U.S. Appl. No. 13/109,763 dated Mar. 4, 2013.

Final Office Action for U.S. Appl. No. 13/109,763 dated Jun. 14, 2013.

Advisory Action for U.S. Appl. No. 13/109,763 dated Aug. 26, 2013.

Non-Final Office Action for U.S. Appl. No. 13/100,938 dated Nov. 7, 2013.

* cited by examiner

PRIOR ART

PATH RENDERING WITH PATH CLIPPING

CROSS-REFERENCE TO RELATED APPLICATIONS

This application claims priority benefit to United States provisional patent application titled, "Path Rendering," filed on May 21, 2010 and having Ser. No. 61/347,359. This related application is also hereby incorporated by reference in its entirety.

BACKGROUND OF THE INVENTION

1. Field of the Invention

The present invention generally relates to graphics processing and more specifically to path rendering with path clipping.

2. Description of the Related Art

Path rendering is a style of resolution-independent two-dimensional (2D) rendering, often called "vector graphics," that is the basis for a number of important rendering standards such as PostScript, Java 2D, Apple's Quartz 2D, OpenVG, PDF, TrueType fonts, OpenType fonts, PostScript fonts, Scalable Vector Graphics (SVG) web format, Microsoft's Silverlight and Adobe Flash for interactive web experiences, Open XML Paper Specification (OpenXPS), drawings in Office file formats including PowerPoint, Adobe Illustrator illustrations, and more.

Path rendering is resolution-independent meaning that a scene is described by paths without regard to the pixel resolution of the framebuffer. This is in contrast to the resolution-dependent nature of so-called bitmapped graphics. Whereas bitmapped images exhibit blurred or pixilated appearance when zoomed or otherwise transformed, scenes specified with path rendering can be rendered at different resolutions or otherwise transformed without blurring the boundaries of filled or stroked paths.

Sometimes the term vector graphics is used to mean path rendering, but path rendering is a more specific approach to computer graphics. While vector graphics could be any computer graphics approach that represents objects (typically 2D) in a resolution-independent way, path rendering is a much more specific rendering model with salient features that include path filling, path stroking, dashing, path masking, compositing, and path segments specified as Bèzier curves.

FIG. 1A is a prior art scene composed of a sequence of paths. In path rendering, a 2D picture or scene such as that shown in FIG. 1A is specified as a sequence of paths. Each path is specified by a sequence of path commands and a corresponding set of scalar coordinates. Path rendering is analogous to how an artist draws with pens and brushes. A path is a collection of sub-paths. Each sub-path (also called a trajectory) is a connected sequence of line segments and/or curved segments. Each sub-path may be closed, meaning the sub-path's start and terminal points are the same location so the stroke forms a loop; alternatively, a sub-path can be open, meaning the sub-path's start and terminal points are distinct.

When rendering a particular path, the path may be filled, stroked, or both. As shown in FIG. 1A, the paths constituting the scene are stroked. When a path is both filled and stroked, typically the stroking operation is done immediately subsequent to the filling operation so the stroking outlines the filled region. Artists tend to use stroking and filling together in this way to help highlight or offset the filled region so typically the stroking is done with a different color than the filling.

FIG. 1B is the sequence of paths shown in FIG. 1A with only filling. Filling is the process of coloring or painting the set of pixels "inside" the closed sub-paths of a path. Filling is similar to the way a child would "color in between the lines" of a coloring book. If a sub-path within a path is not closed when such a sub-path is filled, the standard practice is to force the sub-path closed by connecting its end and start points with an implicit line segment, thereby closing the sub-path, and then filling that resulting closed path.

While the meaning of "inside a path" generally matches the intuitive meaning of this phrase, path rendering formalizes this notion with what is called a fill-rule. The intuitive sense of "inside" is sufficient as long as a closed sub-path does not self-intersect itself. However if a sub-path intersects itself or another sub-path or some sub-paths are fully contained within other sub-paths, what it means to be inside or outside the path needs to be better specified.

Stroking is distinct from filling and is more analogous to tracing or outlining each sub-path in a path as if with a pen or marker. Stroking operates on the perimeter or boundary defined by the path whereas filling operates on the path's interior. Unlike filling, there is no requirement for the sub-paths within a path to be closed for stroking. For example, the curve of a letter "S" could be stroked without having to be closed though the curve of the letter "O" could also be stroked.

FIG. 1C is a prior art scene composed of the sequence of paths from FIG. 1A with the stroking from FIG. 1A and the filling from FIG. 1B. FIG. 1C shows how filling and stroking are typically combined in a path rendering scene for a complete the scene. Both stroking and filling are integral to the scene's appearance.

Traditionally, graphics processing units (GPUs) have included features to accelerate 2D bitmapped graphics and three-dimensional (3D) graphics. In today's systems, nearly all path rendering is performed by a central processing unit (CPU) performing scan-line rendering with no acceleration by a GPU. GPUs do not directly render curved primitives so path rendering primitives such as Bèzier segments and partial elliptical arcs must be approximated by lots of tiny triangles when a GPU is used to render the paths. Constructing the required tessellations of a path that is approximated by many short connected line segments can create a substantial CPU burden. The triangles or other polygons resulting from tessellation are then rendered by the GPU. Because GPUs are so fast at rasterizing triangles, tessellating paths into polygons that can then be rendered by GPUs is an obvious approach to GPU-accelerating path rendering.

Tessellation is a fragile, often quite sequential, process that requires global inspection of the entire path. Tessellation depends on dynamic data structures to sort, search, and otherwise juggle the incremental steps involved in generating a tessellation. Path rendering makes this process considerably harder by permitting curved path segments as well as allowing path segments to self-intersect, form high genus topologies, and be unbounded in size.

A general problem with using a GPU to render paths is unacceptably poor antialiasing quality when compared to standard CPU-based methods. The problem is that CPUs rely on point sampling for rasterization of triangular primitives with only 1 to 8 samples (often 4) per pixel. CPU-based scan-line methods typically rely on 16 or more samples per pixel and can accumulate coverage over horizontal spans.

Animating or editing paths is costly because it requires re-tessellating the entire path since the tessellation is resolution dependent, and in general it is very difficult to prove a local edit to a path will not cause a global change in the tessellation of the path. Furthermore, when curved path segments are present and the scaling of the path with respect to pixel space changes appreciably (zooming in say), the curved path segments may need to be re-subdivided and re-tessellation is likely to be necessary.

Additionally, compositing in path rendering systems typically requires that pixels rasterized by a filled or stroked path are updated once-and-only-once per rasterization of the path. This requirement means non-overlapping tessellations are required. So for example, a cross cannot be tessellated as two overlapping rectangles but rather must be rendered by the outline of the cross, introducing additional vertices and primitives. In particular, this means the sub-paths of a path cannot be processed separately without first determining that no two sub-paths overlap. These requirements, combined with the generally fragile and sequential nature of tessellation algorithms make path tessellation particularly expensive. Because of the expense required in generating tessellations, it is very tempting and pragmatic to cache tessellations. Unfortunately such tessellations are much less compact than the original path representations, particularly when curved path segments are involved. Consequently, a greater amount of data must be stored to cache paths after tessellation compared with storing the paths prior to tessellation. Cached tessellations are also ineffective when paths are animated or rendered just once.

Conventional stroking has been performed by approximating paths into sub-pixel linear segments and then tracing the segments with a circle having a diameter equal to a stroke width. Offset curves are generated at the boundary of the stroked path. These offset curves are typically of much higher degree of complexity compared with the linear segments that are traced to generate the stroked path. Determining whether or not each pixel is inside or outside of a stroked path to generate the stroking is mathematically complex. Identification of the pixels to be stroked is equivalent to identifying pixels that are within half of the stroke width of any point along the path to be stroked. More specifically, the pixels to be stroked are within half of the stroke width measured along a line that is perpendicular to the tangent of the path segment being stroked.

In standard path rendering systems, paths are specified as a sequence of cubic and quadratic (non-rational) Bèzier curve segments, partial elliptical arcs, and line segments. While more mathematically complex path segments representations could be used to specify paths, in practice, existing standards limit themselves to the aforementioned path segment types.

Path filling and stroking use the same underlying path specification. For filling, this means the resulting piece-wise boundaries to be filled may be up to third-order (in the case of cubic Bèzier segments) or rational second-order (in the case of partial elliptical arcs). Filling these curved boundaries of Bèzier curves and arcs is clearly harder than filling the standard polygonal primitives in conventional polygonal 2D or 3D rendering where the boundaries (edges) of the polygonal primitives (usually triangles) are all first-order, being linear segments, and often required to be convex. Filling (and stroking) are also harder than conventional line and convex polygon rasterization because paths are unbounded in their complexity whereas line segments and triangles are defined by just 2 or 3 points respectively. A path may contain just a single path segment or it could contain thousands or more.

The boundaries of stroked paths are actually substantially higher order than the third-order segments. The offset curve of non-rational (second-order) quadratic and (third-order) Bèzier curves are eighth- and tenth-order curves respectively. This high order makes exact determination and evaluation of the resulting offset curves for such Bèzier segments intractable for use in direct rendering. In other words, it is quite unreasonable to try to determine exactly the boundary representation of such offset curves and then simply fill them. For this reason, various techniques have been developed to approximate offset curves with sequences of Bèzier, arc, or line segments. These approximate stroke boundaries may then be filled.

Proper stroking is hard because of the mathematical complexity of the boundary of a path's stroke compared to a path's fill. While approximations to the actual stroke boundary can reduce this complexity, such approximations have associated costs due to inaccuracy and the resulting expansion in the number of primitives that must be both stored and processed to render such approximated strokes. For example, the stroke of a quadratic Bèzier segment can be represented with just the segment's 3 control points (along with the per-path stroke width) whereas an approximation of this stroked boundary with line segments might require dozens or even hundreds of triangles to tessellate approximately the stroked region. Indeed the quality of such tessellations depends on the projection of the curved segment to pixel (or screen) space; this means rendering the same stroked curve at different resolutions would necessitate different tessellations.

In addition to supporting path stroking and filling, most path rendering systems provide clipping and masking operations that allow the drawing of first path to be restricted to the region covered by a second path. Clipping and masking are similar but distinct operations. Each technique involves two paths. In clipping, there is a draw path as well as a clip path. In masking, there is a draw path as well as a mask path. In both cases, the draw path is the path that actually colors samples, whereas the clip and mask paths simply limit that coloring.

When clipping, the coverage of the draw path is strictly limited to the region of the frame buffer covered by the clip path. When clipping paths, color samples are updated in the frame buffer only if the sample is covered by both the rendered draw path and the clip path. In other words, clipping updates color samples within the intersection of the coverage of the two paths. How the updated color samples are colored however depends solely on the rendered draw path.

Masking is similar to clipping, but the opacity of the mask path is used to modulate the coloring generated by the draw path. For example, a mask path having 25% opacity in a rectangular region may be applied to a draw path to faintly draw whatever shape and coloring the draw path specifies. Often the opacity of the mask path may vary; for example, the mask path's opacity may have some radial fall-off so the draw path appears to be more lightly represented away from the center of the mask path's center of radial fall-off.

Clipping is essentially a type of "hard" masking since in clipping the opacity of the clip path is irrelevant to how the rendered path is colored; it is only the coverage of the clip mask that limits the rendered path. Masking however is a "soft" operation because the opacity of the mask path modulates the coloring of the rendered draw path. Regions outside of the mask path are assumed to have 0% opacity, which is the same as fully or 100% transparent.

In conventional path rendering, clipping and masking are relatively expensive operations. Clipping involves computing the intersection between two arbitrary paths. In a path renderer based on tessellation, this can be quite expensive. In a path renderer implemented with scan-line rasterization, clipping involves tracking two sets of path edges for the clipping and rendered paths.

Accordingly, what is needed in the art is an improved system and method for rendering paths including clipping and masking of paths.

SUMMARY OF THE INVENTION

One embodiment of the present invention sets forth a technique for rendering clipped paths by first generating clip stencil buffer state indicating pixels that are inside of the clip path. Clipped draw stencil buffer state is then generated indicating pixels of a draw path that should be covered based on the clip stencil buffer state and coverage of the draw path. The clipped draw path is then filled or stroked to produce the clipped draw path through a process of stenciling and then covering paths. The clip and draw paths may be filled or stroked without tessellating the paths. Path rendering may be accelerated when a GPU or other processor that is configured to perform operations to generate the clip stencil buffer state and the clipped draw stencil buffer state, and to fill or stroke the clipped draw path.

Various embodiments of a method of the invention for rendering paths clipped by another arbitrary path include receiving a clip path including path stencil and cover geometry and a draw path also including its respective path stencil and cover geometry.

The stencil buffer includes clipped draw stencil buffer state indicating coverage for each individual draw path sample position that is clipped by a clip path and clip stencil buffer state indicating sample positions inside of the clip path. The clip stencil buffer state may be separately applied to different draw paths to generate respective clipped draw stencil buffer state. Regions of filled or stroked draw paths can be clipped by using the clip stencil buffer state. The clip stencil buffer state (for the clip path) and the clipped draw stencil buffer state can be stored in a single stencil buffer by segregating the clip stencil buffer state into a certain bit planes of the stencil buffer, typically maintaining the clip stencil buffer state in the most significant bit plane of the stencil buffer. The bit-wise read and write masking of stencil buffer updates facilitates this usage. Regions of filled or stroked draw paths can be masked when an opacity value, e.g., alpha, is associated with each stencil buffer value. More generally Boolean combinations may be applied by the clip stencil buffer state during stencil testing so that unions, intersections, or differences of the clip path and the draw path can be performed and the resulting region can be shaded.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1A:
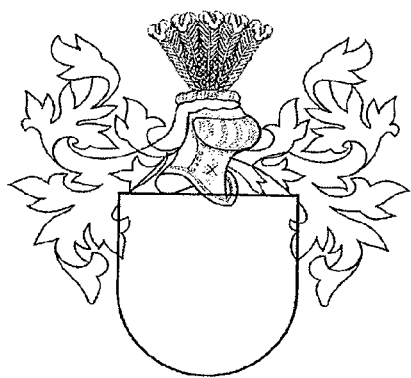
FIG. 1A is a prior art scene composed of a sequence of paths.
Figure 1B:
FIG. 1B is the fill for the prior art scene shown in FIG. 1A.
Figure 1C:
FIG. 1C is the prior art scene of FIG. 1A with the fill of FIG. 1B and the stroked sequence of paths.
Figure 2A:
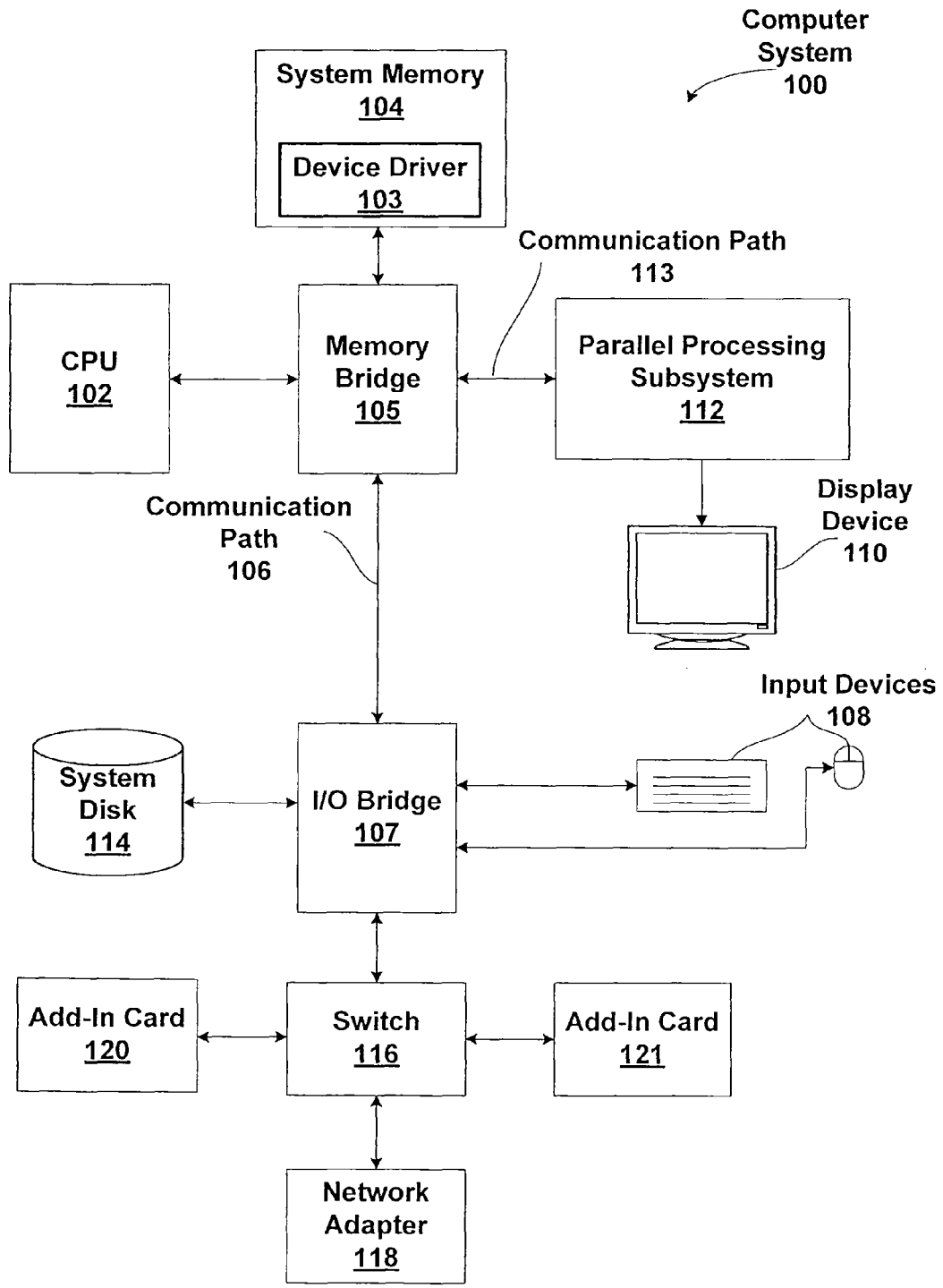
FIG. 2A is a block diagram illustrating a computer system configured to implement one or more aspects of the present invention.

FIG. 2A is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 2A may be implemented using any suitable protocols, such as PCI (Peripheral Component Interconnect), PCI-Express, AGP (Accelerated Graphics Port), HyperTransport, or any other bus or point-topoint communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2B:
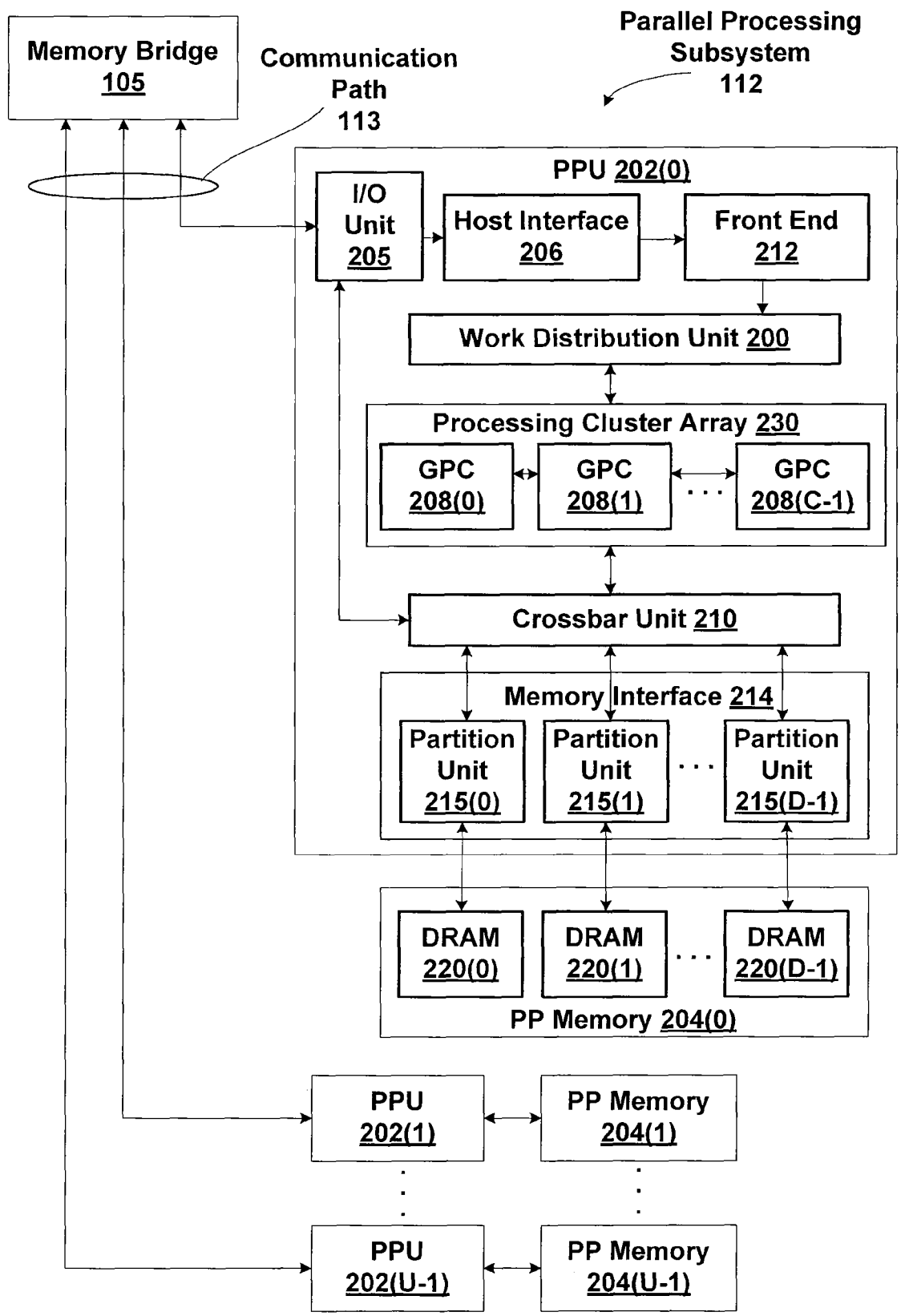
FIG. 2B is a block diagram of a parallel processing subsystem for the computer system of FIG. 2A, according to one embodiment of the present invention.

FIG. 2B illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 2A, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and communications path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 2A or FIG. 2B) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2B, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform patch tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in pixel space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2B, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
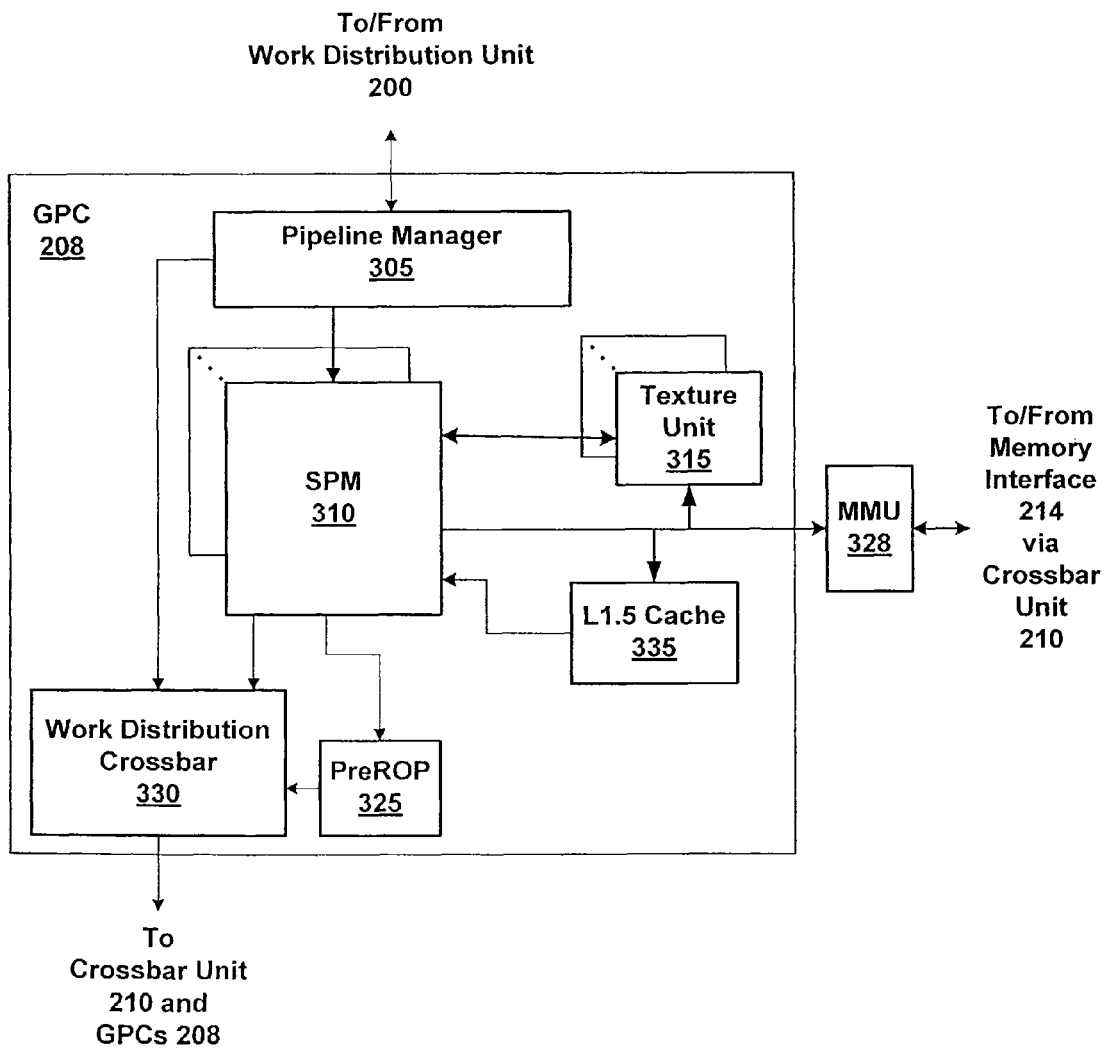
FIG. 3A is a block diagram of a GPC within one of the PPUs of FIG. 2B, according to one embodiment of the present invention.

FIG. 3A is a block diagram of a GPC 208 within one of the PPUs 202 of FIG. 2B, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
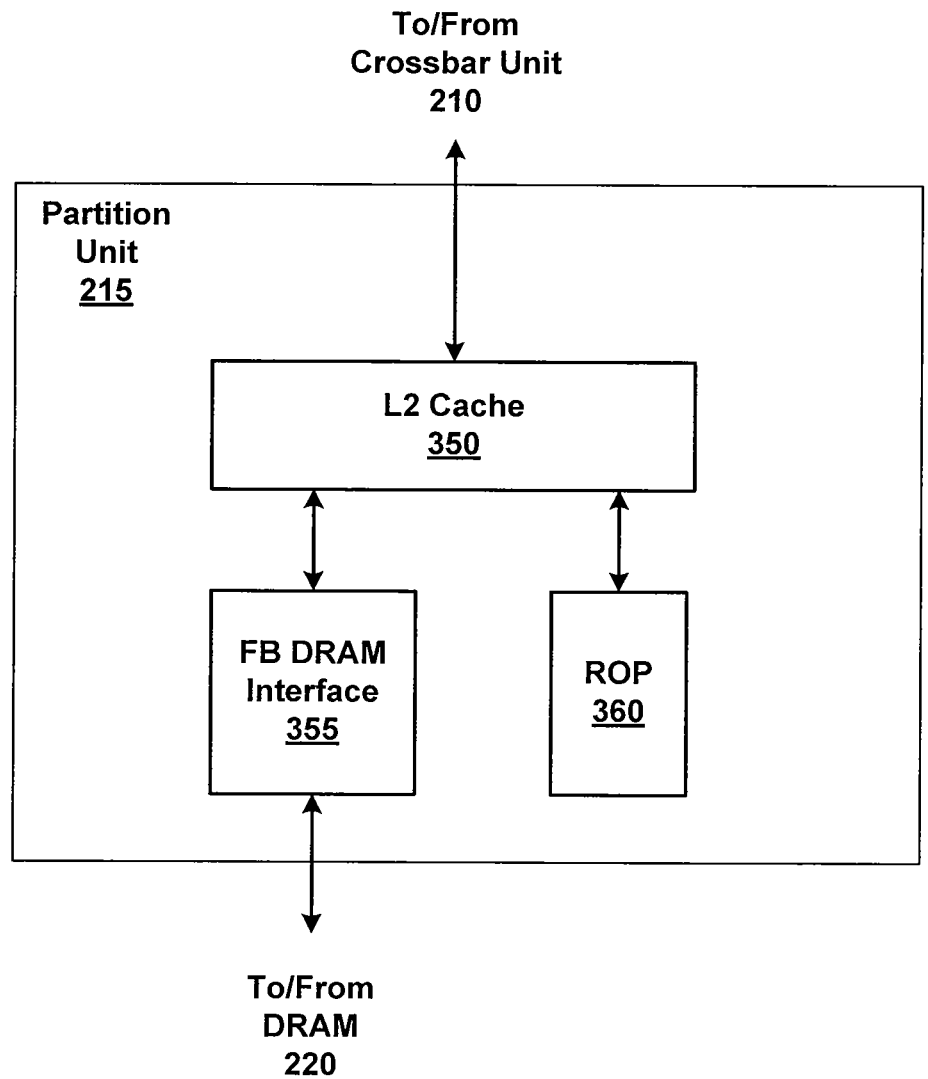
FIG. 3B is a block diagram of a partition unit within one of the PPUs of FIG. 2B, according to one embodiment of the present invention.

FIG. 3B is a block diagram of a partition unit 215 within one of the PPUs 202 of FIG. 2B, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 2A, 2B, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
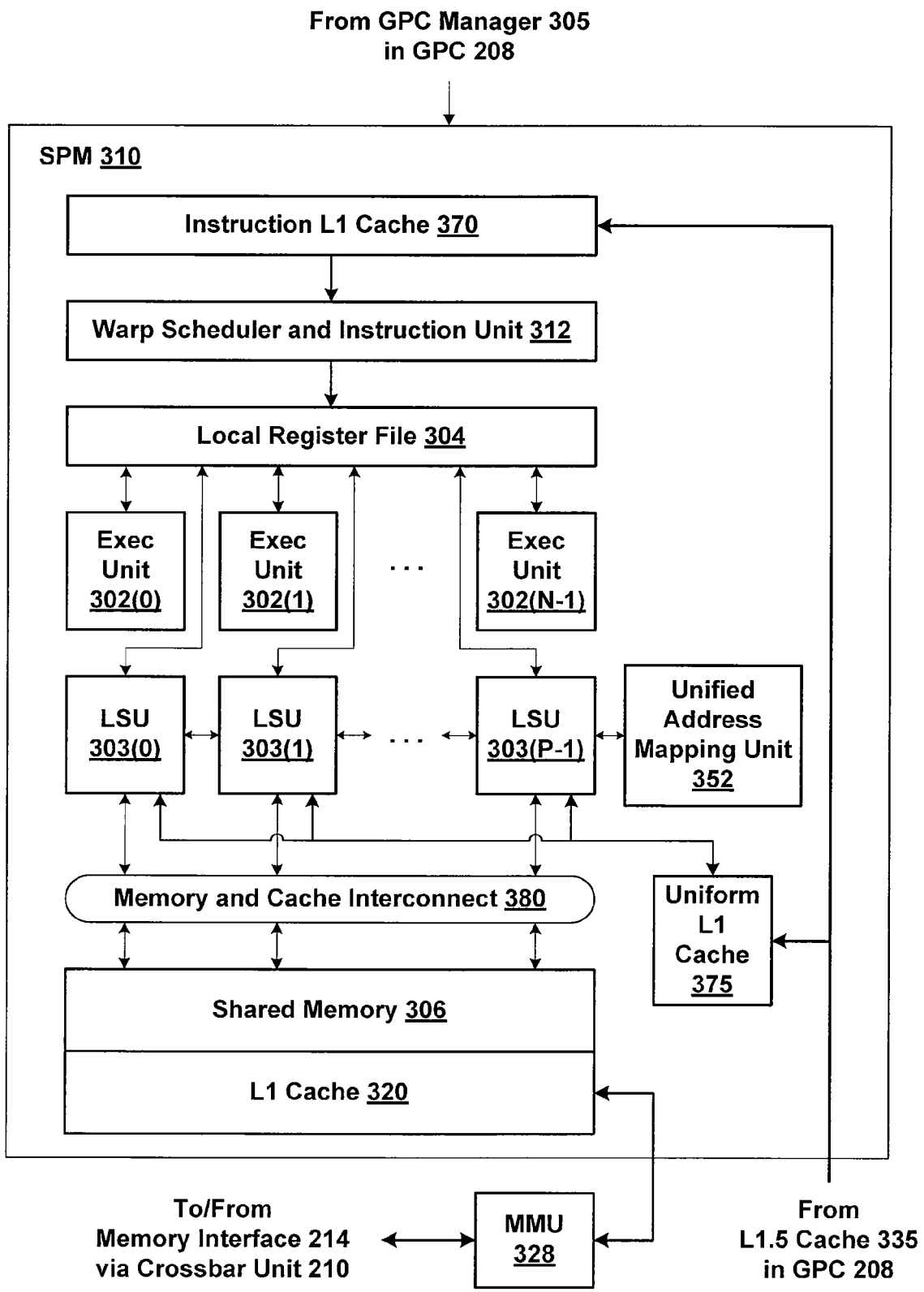
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 375, the shared memory 306, and the L1 cache 320 via a memory and cache interconnect 380. The uniform L1 cache 375 is configured to receive read-only data and constants from memory via the L1.5 Cache 335.

Graphics Pipeline Architecture

Figure 4:
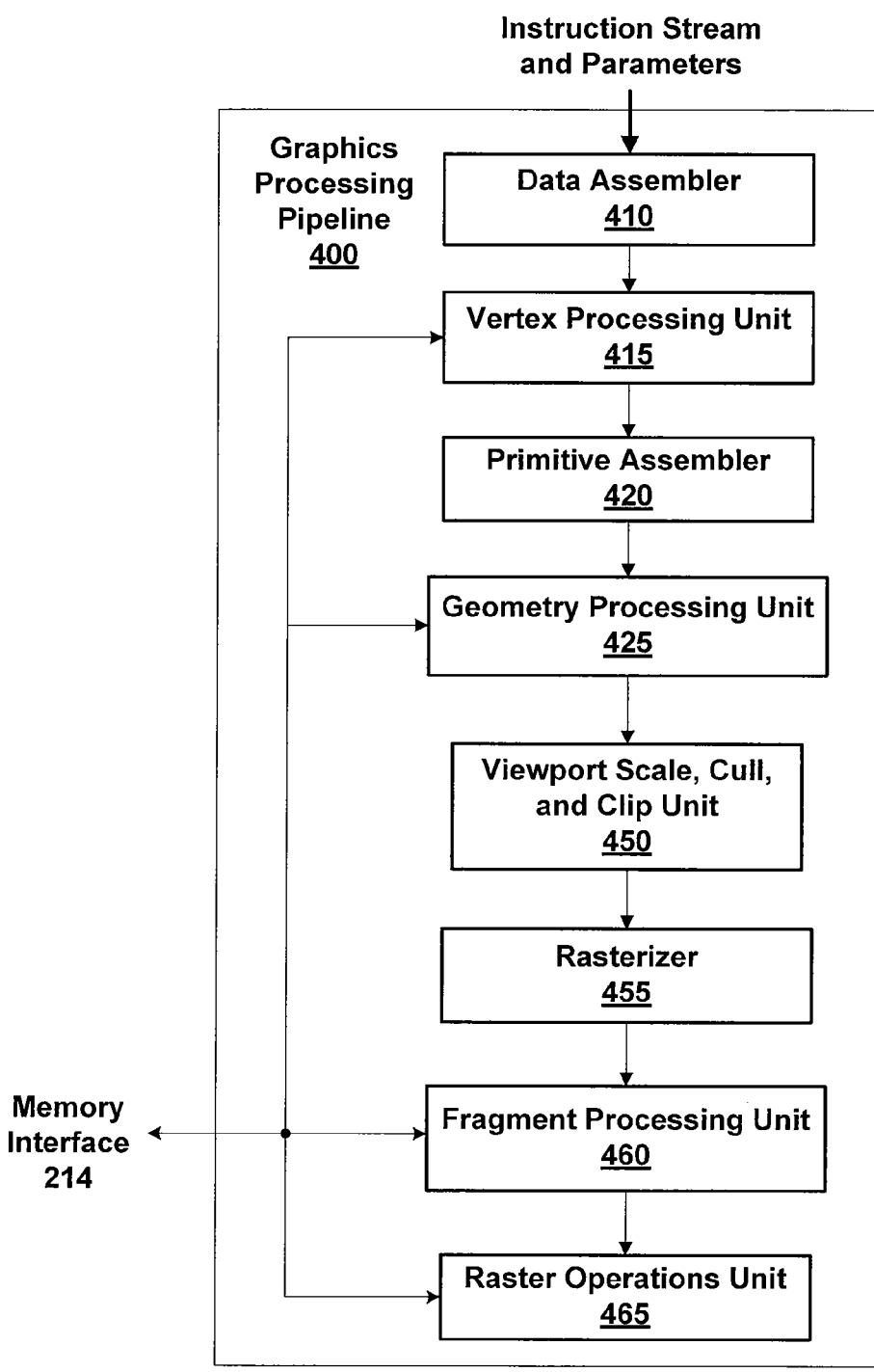
FIG. 4 is a conceptual diagram of a graphics processing pipeline that one or more of the PPUs of FIG. 2B can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Generating a Stencil Buffer Indicating Path Coverage

A path consists of zero or more sequences of connected path segment commands for line segments, Bèzier segments, and partial elliptical arcs. Stencil buffer state indicating pixel coverage for filling or stroking a path may be generated. Clip stencil buffer state is generated by rendering a stroke or fill region of a clip path. The clip stencil buffer state is then applied using stencil operations during rendering of a stroke or fill region of a draw path to generate of a clipped draw stencil buffer state for the draw path. The clipped draw stencil buffer state then restricts generated coverage during the cover of the draw path, producing a rendered draw path that is filled and/or stroked and clipped by the clip path. Different techniques are used to prepare the clip and draw paths before the stencil buffer can be generated. When a path will be filled, the path is decomposed into simple cubic Bezier segments and lower order segments. When a path will be stroked, the path is approximated by quadratic Bezier segments and lower order segments. These simple cubic Bezier segments, quadratic Bezier segments, and lower order segments that represent the path and geometry that is rendered to generate the stencil buffer can be generated from a path specification.

When a path is filled, cubic Bèzier segments pose a particular challenge when these segments are rendered into the stencil buffer to determine which framebuffer sample locations are within the filled region of the respective path. If not done carefully, multiple classes of cubic Bèzier segments can contribute incorrect winding number offsets to the net winding number for a particular framebuffer sample location. An incorrect winding number determination immediately leads to an incorrect determination of the rasterized filled region of said path. Decomposing each arbitrary cubic Bèzier in a path into one or more simple cubic Bèzier segments produces a geometry set that is suitable for rendering filled paths containing cubic Bèzier segments. Such decomposition is beneficial because it results in a robust determination of the filled region of a rendered path without tessellating the path. The path is divided into cubic Bèzier path segments that are each classified and further divided into simple cubic Bèzier path segments. Care must be taken to preserve the proper vertex winding order of each simple Bèzier cubic segment, split the original cubic Bèzier at the proper positions, and linearly interpolate texture.

A cubic Bèzier curve has the freedom, unlike a quadratic Bèzier curve, to specify arbitrary initial and terminal tangent directions for its end-points. This control makes cubic Bèzier curves popular with artists. This additional control comes from the curve being described by a third-order polynomial equation instead of a second-order equation in the case of a quadratic Bèzier curve (and first-order in the case of line segments). This additional polynomial degree provides the requisite freedom for a cubic Bèzier segment to non-trivially self-intersect itself or cross the line formed by the segment's initial and terminal control points. These conditions result in reversals of the local sense of "inside" and "outside" the path.

In order for a tessellation-free path filling approach based on stencil counting of rasterized polygons to be robust when a discard shader is used to write a stencil buffer, such situations must be avoided. Decomposing complex cubic Bezier path segments of filled paths into simple cubic Bezier path segments is described in patent application Ser. No. 13/097,483filed Apr. 29, 2011, and titled "Decomposing Cubic Bèzier Path Segments for Tessellation-Free Stencil Filling."

A set of path cover stencil values in a stencil buffer may be generated that indicates the pixels, or more generally framebuffer sample locations, that are inside of a path to be filled by incrementing each path cover stencil buffer value corresponding to pixels, or more generally samples, that are within front-facing path geometry. Likewise, if the path geometry is back-facing, the rasterization process decrements each path cover stencil value corresponding to pixels within the back-facing path geometry. Clip path cover stencil buffer state that is generated for a clip path indicates the pixels, or more generally framebuffer sample locations, that are inside of a filled or stroked clip path. Geometry that covers the clip path (covering geometry) may be rendered that converts the path cover stencil buffer state into a clip stencil mask. The stencil buffer may be configured to store a clip stencil buffer state that is separate from clip path cover stencil buffer state. Values of the clip stencil mask are retained during a subsequent generation of a draw path stencil buffer state for a draw path. The clip stencil buffer can then be applied to clip different draw paths.

Path geometry for a path to be filled includes hull geometry and anchor geometry. In another embodiment, stencil values are decremented for front-facing (clockwise winding) primitives and incremented for back-facing (counter-clockwise winding) primitives. Importantly, the decrements, as well as any increments, perform modulo or wrapping arithmetic (rather than saturating arithmetic). This is crucial given the limited integer precision (typically 8 bits) of the stencil buffer. In this example, this means if the stencil buffer was initially cleared to zero, the result of these decrements to an 8-bit stencil buffer would be the value 255 resulting from modulo-256 arithmetic. When an upper bit of each 8-bit stencil value is used to store a clip stencil mask, modulo-128 arithmetic can be accomplished using a stencil write mask of 0x7F so that the one bit (the most significant bit) is not changed. Accurate determination of path fill coverage typically requires many fewer bits of stencil precision than 7 so maintaining a clip stencil mask does not influence the fill coverage determination. Alternative arrangements of the stencil buffer update configuration are possible to maintain a plurality of clip stencil masks.

In one embodiment, batches of path geometry are drawn together that mix front- and back-facing polygons such that two-sided stencil testing can increment and decrement the stencil based on each polygon's determined facingness. The color and depth writes are disabled during generation of path cover stencil buffer state, clip stencil buffer state, or clipped draw stencil buffer state. When the clip path is used to perform masking, an opacity value may be written to an alpha buffer during generation of the clip stencil buffer state.

Once generation of the path cover stencil values is complete, writes to the color buffer are enabled and the pixels that are inside of the path may be filled by using the stencil buffer to write the color buffer when a conservative bounding geometry referred to as covering geometry, that encloses a closed path is rendered. The covering geometry may be a set of polygons, including a polygon defined by all of the vertices of both the convex hull geometry and anchor geometry for a path to be filled. Alternatively, the covering geometry may be a single polygon that encloses the entire closed path to be filled or stroked. The covering geometry should conservatively enclose the path to be filled or stroked.

When rendering the path geometry and the covering geometry, the vertices belonging to the geometry are subject to an arbitrary projective transformation so the sense of front- or back-facing in object space may be the opposite sense after vertex transformation into pixel space. In one embodiment, the ROP 360 (alternatively raster operations unit 465) performs the increments and decrements of path cover stencil values while the rasterizer 455 rasterizes the path geometry.

As previously explained, a rendered path may be filled and/or stroked. Path stroking has an associated "stroke width" that defines the region that is included in the stroke when a circle having a diameter of the stroke width is moved along the path segment. The path segment is considered a generating curve and the circle generates an inside offset curve and an outside offset curve as the circle moves along the path segment. Mathematical computation of the boundary of such offset curves is difficult. Because stroking is an important operation for many application programs that produce 2D images, it is desirable to accelerate stroking operations. In one embodiment, a GPU, such as the PPU 202, may be used to perform functions to accelerate stroking operations. Importantly, tessellation of the path segments is avoided. Instead, a path is decomposed into quadratic Bèzier path segments or segments of lower complexity, e.g., arcs, line segments, and the like. The stroking operations are accelerated without determining or even approximating the boundary of the strokes (the inside and outside offset curves) that can be defined by high-order polynomials. Instead, computations are performed to determine whether or not discrete point locations are inside or outside of a particular quadratic Bezier stroke or stroke of lower complexity.

Point containment algorithms determine whether a point is "inside" or "outside" the boundary of a closed curve. The process of filling and stroking a path involves determining the set of samples contained within a closed path or the envelope of a path, respectively. Applying some point containment algorithm to each and every sample that is potentially within the boundary defined by the path or stroked boundary is fundamental to the process of stroking a rendered path. Additional details of a technique for point containment during path rendering are described in patent application Ser. No. 13/097,993filed Apr. 29, 2011, and titled "Point Containment for Quadratic Bèzier Strokes."

The path geometry for a stroked path includes hull geometry bounding quadratic Bèzier path segments and a set of polygonal geometry for any square or triangular end-caps or mitered or beveled join styles. The stroking engine also collects or generates a set of polygonal geometry for rounded stroking with associated texture coordinates to generate round end-caps, join styles, and hemi-circles for cusps of curved segments converted to line segments. This geometry may include texture coordinates indicating vertex position relative to the junction, end-point, or cusp.

When a path is stroked, the path cover stencil values indicate pixels that are within the stroke region of the path, and the pixels that are inside of the path may be stroked by using the stencil buffer to write the color buffer when covering geometry that encloses a closed path is rendered. During this second rendering pass to cover the path, the path cover stencil values may be cleared for each pixel as a fill color is written to the color buffer for the respective pixel. Clearing the stencil value of each pixel is straightforward to accomplish with standard stencil operations such as Zero or Replace.

Additional details of a technique for performing two-step path rendering are described in patent application Ser. No. 13/100,938 filed May 4, 2011, and titled "Path Rendering by Covering the Path Based on a Generated Stencil Buffer."

Clipping Paths

In addition to the path cover stencil values, the stencil buffer can also represent clip stencil values that may be a single bit that functions as a mask bit. When clipping is used, the collection of clip stencil values stored in the stencil buffer is referred to as the clip stencil buffer state and the collection of draw path cover stencil values stored in the stencil buffer is referred to as the draw stencil buffer state.

Figure 5A:
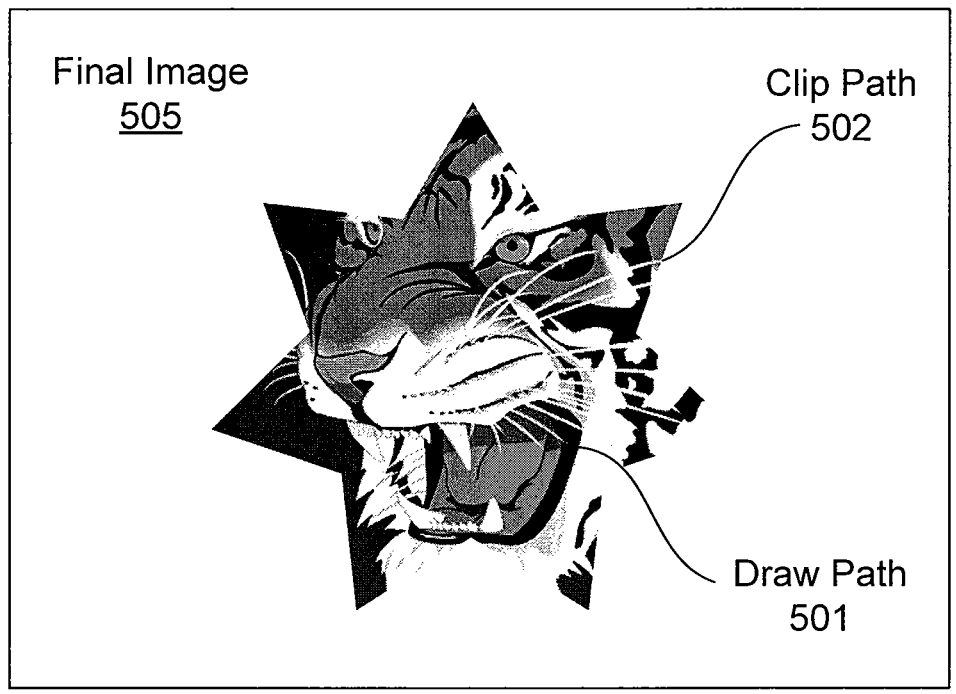
FIG. 5A illustrates a final image resulting from the application of a clip path to clip a draw path, according to one embodiment of the invention.

FIG. 5A illustrates a final image 505 resulting from the application of a clip path 502 to clip a draw path 501, according to one embodiment of the invention. The clip path 502 is a star shape and the draw path 501 is a set of paths that are stroked and filled to form the image of a tiger. When the draw path 501 is clipped by the clip path 502, the stencil buffer is configured to store stencil values indicating a fill or stroke region of the clip path 502 in a clip stencil buffer state.

Figure 5B:
FIG. 5B illustrates clip stencil buffer state, according to one embodiment of the invention.

FIG. 5B illustrates a clip stencil buffer state 510, according to one embodiment of the invention. First, the stencil buffer is initialized to a neutral value, e.g., 0x0. The clip stencil buffer state 510 is generated by rendering path geometry for the clip path 502 to produce a path cover stencil buffer state, incrementing and decrementing as needed. In other words, the coverage of the clip path 502 is stenciled into the stencil buffer with a "stencil" step. The path cover stencil buffer state generated for the clip path 502 may include various non-neutral stencil values for samples that are inside of the clip path 502. Any non-neutral stencil values are samples that are inside of the clip path 502.

The clip path 502 is not supposed to affect the color buffer but rather restrict the coverage of the draw path 501 to be clipped. So, instead of the conventional "cover" step that rasterizes covering geometry to fill or stroke the clip path 502 using the path cover stencil buffer state, a "cover" step is performed that transfers the computed coverage represented by the path cover stencil buffer state into the clip stencil buffer state 510. The clip stencil buffer state 510 may be transferred to the most-significant bit of each value in the stencil buffer. To transfer the clip path coverage to the clip stencil buffer state 510, color writes are disabled (unlike the "cover" step for the draw path 501) and the stencil test is configured to set the most-significant bit of the stencil buffer (typically the 128 bit in an 8-bit stencil buffer) and clear the other stencil bits, based on the path cover stencil buffer state. The result of the "cover" step is the clip stencil buffer state 510. When masking is used, the "cover" step may also write opacity values into an alpha buffer for use during blending when the draw path 501 is covered.

Figure 5C:
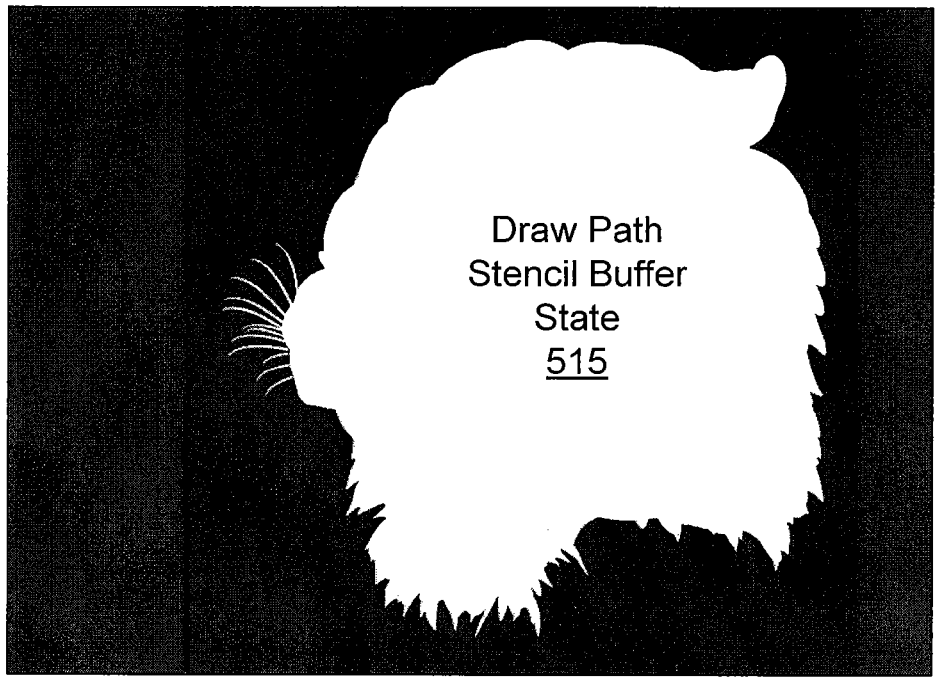
FIG. 5C illustrates draw path stencil buffer state, according to one embodiment of the invention.

FIG. 5C illustrates a draw path stencil buffer state 515, according to one embodiment of the invention. When clipping is not used, path cover stencil buffer state is generated, such as the draw path stencil buffer state 515 for the draw path 501. The resulting path cover stencil buffer state has non-zero stencil values in the stencil bits that are covered by the draw path 501 while stencil values not in draw path 501 are zero. When clipping is performed the resulting path cover stencil buffer state should have non-zero stencil for samples that are covered by both the clip path 502 and the draw path 501.

Figure 5D:
FIG. 5D illustrates clipped draw stencil buffer state, according to one embodiment of the invention.

FIG. 5D illustrates a clipped draw stencil buffer state 520, according to one embodiment of the invention. The white region of the clipped draw stencil buffer state 520 indicates samples that are covered by both the clip path 502 and the draw path 501.

To generate the clipped draw stencil buffer state 520, the stencil test is configured to discard samples when the clip stencil buffer state 510 (e.g., most-significant bit of the stencil buffer) is not set. The stencil write mask is also restricted so that the clip stencil buffer state 510 will not be changed. The following OpenGL command (part of the NV_path_rendering OpenGL extension and matching the parameters of the standard glStencilFunc command) may be used to configured the stencil operations, where the first 0x80 is a reference value, the second 0x80 is a read mask:

glPathStencilFuncNV(GL_EQUAL, 0x80, 0x80);

The commands in NV_path_rendering to stencil paths (glStencilFillPathNV or glStencilStrokePathNV) accept a stencil write mask parameter to restrict stencil updates to certain bits of the stencil buffer. In one embodiment, setting the stencil write mask to 0x7F avoids updating the most-significant (0x80) bit of the stencil buffer.

The path geometry for the draw path 501 is then rendered using a "stencil" step to generate the clipped draw stencil buffer state 520. In contrast, with the "stencil" step used to generate the draw path stencil buffer state 515, where the stencil function would be set to GL_ALWAYS (disabling the stencil test), the stencil function used to generate the clipped draw stencil buffer state 520 is set to GL_EQUAL. The resulting clipped draw stencil buffer state 520 has non-zero stencil values for samples that are covered by both the clip path 502 and the draw path 501.

After the clipped draw stencil buffer state 520 is generated, the draw path 501 may be filled and clipped by performing a "cover" step. Instead of testing if all of the bits of the stencil buffer store non-neutral values, as is done to fill the draw path 501 without clipping, the bits of the clipped draw stencil buffer state 520, e.g., bits of the stencil buffer excluding the msb, are tested. Samples corresponding to non-neutral stencil values of the clipped draw stencil buffer state 520 are filled by the draw path 501. The following OpenGL commands may be used to configured the stencil operations to cover the draw path 501, where 0x0 is a reference value, 0x7F is a read mask, and 0xFF is a write mask:

```
glStencilFunc(GL_NOTEQUAL, 0x0, 0x7F);
glStencilOp(GL_KEEP, GL_KEEP, GL_ZERO);
glStencilMask(0xFF);
```

A sample in the final image 505 will only be colored if the corresponding stencil value of the clipped draw stencil buffer state 520 is a non-neutral value (due to the read mask of 0x7F that excludes the msb (most significant bit) where the clip stencil buffer state values are stored in the stencil buffer). Importantly, for any of the non-most-significant bits to be set, the stencil test must have passed in the prior "stencil draw" step used to generate the clipped draw stencil buffer state 520 which would have required the most-significant stencil bit to be set (assuming a clip stencil buffer initially cleared completely to zero). Therefore, for the stencil test to pass during covering of the draw path 501 using the clipped draw stencil buffer state 520, the sample must be both within the draw path 501 and the clip path 502.

While the operations configured for the "cover" step that fills the clipped draw stencil buffer state 520 will restore (by writing) neutral values to the all the stencil values for samples updated in the final image 505, stencil values for the clip stencil buffer state 510 that are inside of the clip path 502, but not inside of the draw path 501 are not restored. To remedy this, one additional "cover" step is performed to write neutral values to any clip buffer stencil values left non-zero even after covering the clipped draw stencil buffer state 520. The additional "cover" step rasterizes the covering geometry for the clip path with writes to the frame buffer disabled and stencil testing and stencil operations configured to write neutral values to any stencil values covered by the clip stencil buffer state 510, i.e., stencil buffer values with the most-significant bit set. The following OpenGL commands may be used to configure the stencil operations to cover the clip path 502 and restore the clip stencil buffer state 510, where the first 0x80 is a reference value, the second 0x80 is a read mask, and 0xFF is a write mask:

```
glStencilFunc(GL_EQUAL, 0x80, 0x80);
glStencilOp(GL_KEEP, GL_KEEP, GL_ZERO);
glStencilMask(0xFF);
```

The complete clipping procedure results in a sequence of five steps; essentially "stencil clip, cover clip, stencil draw, cover draw, then cover clip." The result of the first two steps is the clip stencil buffer state 510. The result of the third step is the clipped draw stencil buffer state 520. The result of the fourth step is the final image 505. The last step is needed to initialize the stencil buffer before another clip path is rendered. Although the stencil buffer configuration is described based on a particular orientation of the values in the stencil buffer (zero indicating a sample is outside of a path and non-zero indicating a sample is covered by a path) and using the msb to store the clip stencil buffer state, other configurations may be used to accomplish substantially the same path clipping results.

Path Masking

Masking can be accomplished in a manner that is similar to clipping. A masking path is essentially a clip path with an opacity value (typically alpha). The five step process above becomes: "stencil mask, cover mask, stencil draw, cover draw, then stencil mask." The first "cover mask" step is performed in the same manner as the first "cover clip" step in the five step path clipping process, except that writes to an alpha buffer are enabled during the first "cover mask" step. The masking path's opacity needs to be written into a color buffer component, such as alpha. However, any unused color component stored in the frame buffer will suffice. When the alpha component is used to store the mask opacity, blending with the destination alpha (e.g. GL_DST_ALPHA, and the like) during the subsequent "cover draw" step will modulate the color of the draw path with the opacity of the mask path.

The destination alpha component of the frame buffer may be used for another purpose (such as "under" blending). In such cases, an alternate color buffer can use used to write the opacity of the mask path. This alternate color buffer may be one buffer in a Multiple Render Target configuration (Direct3D terminology) or an extra Draw Buffer (OpenGL terminology). In this situation, the shader used to perform the "cover draw" step should read the frame buffer where the mask opacity is stored (binding this framebuffer as a texture) and modulate the fill or stroke color of the draw path with the fetched mask opacity.

Two-Step Path Rendering

In most 3D graphics rendering systems, stenciling, covering, clipping, and masking are performed in a single rendering pass. Coupling the stenciling step with the covering step makes sense when the operations required determining what samples are covered by a primitive are bounded and inexpensive. For example, determining the coverage of a triangle requires evaluating exactly three edge equations and determining the sample position satisfies all three inequalities. In contrast, filling a path primitive involves an unbounded number of path segments to consider. Path stroking also requires processing path primitives with an unbounded number of segments, but in addition, the number of operations to determine point containment even of a simple quadratic Bèzier segment is approximately two orders of magnitude more than required for point containment by a triangle.

Path rendering systems also assume that blending (used for both opacity and coverage) is performed once-and-only-once for a covered sample. At least one bit of state per sample (a stencil value) is required to track whether or not a primitive has updated that sample. Additionally, when filling or stroking a path, point containment should be performed per-sample while shading can typically be performed at the per-pixel rate. The stencil test is a per-sample test. Whereas programmable per-fragment color shading typically (meaning most efficiently) runs per-pixel. Acceptable path rendering quality typically requires more than one point containment test per pixel. While the point containment determination may then be performed many times per pixel, it is advantageous to limit the shading computations in the cover step to one shading computation to pixel, particularly when complex shading computations are involved. Actual performance results from two-step GPU-accelerated path rendering, with the stencil generation separated from the path covering, indicate that the two-step technique is substantially faster than other known path rendering systems.

By decoupling the "stencil" step for path point containment from the cover step for path shading, the "cover" step can apply an arbitrary shading computation implemented by a standard programmable shader implemented in a standard GPU shading language such as Cg, GLSL, or HLSL or fixed-function operations. This is advantageous because these shaders for covering are no different from the shaders used for conventional 3D shaded rendering. In existing path rendering systems, shading of paths is typically limited to fixed operations that are distinct and different from the programmable shading allowed for 3D rendering. Existing shaders and their extensive systems for compilation and specification can be advantageously used for path rendering as a result of this two-step approach that separates generation of the stencil buffer from covering of the path.

Importantly, the two-step technique takes advantage of the many efficient and parallel units within the GPU. In practice, this means taking advantage of the following performance features of modern GPUs. Some of these performance features include double-rate depth-stencil-only rendering, per-sample shading, bandwidth-efficient stencil operations, two-sided stencil testing, centroid or per-sample interpolation, early (pre-shading) depth-stencil testing, per-tile depth-stencil culling, and the like. Modern GPUs also pipeline multiple render batches to execute them in parallel so multiple stencil and cover steps can be operating within the logical graphics processing pipeline 400 simultaneously while preserving the effect of sequential rendering of the paths.

Before the path cover stencil buffer state, clip stencil buffer state, or clipped draw path stencil buffer state is generated, path geometry is generated to fill or stroke the path. The path geometry is then input to a graphics processing pipeline, such as the graphics processing pipeline 400. In one embodiment, the path is broken down into path segments, cubic Bezier path segments are analyzed, simple cubic Bezier path segments are generated, and anchor geometry and convex hull is generated for the path to be filled. Similarly, the path is broken down into path segments, higher-order segments are approximated by quadratic Bezier segments, and conservative bounding hull, end-cap, and join geometry is generated for the path to be stroked. The generated geometry is referred to as path geometry. In addition to the path geometry, the covering geometry is also generated.

Figure 6:
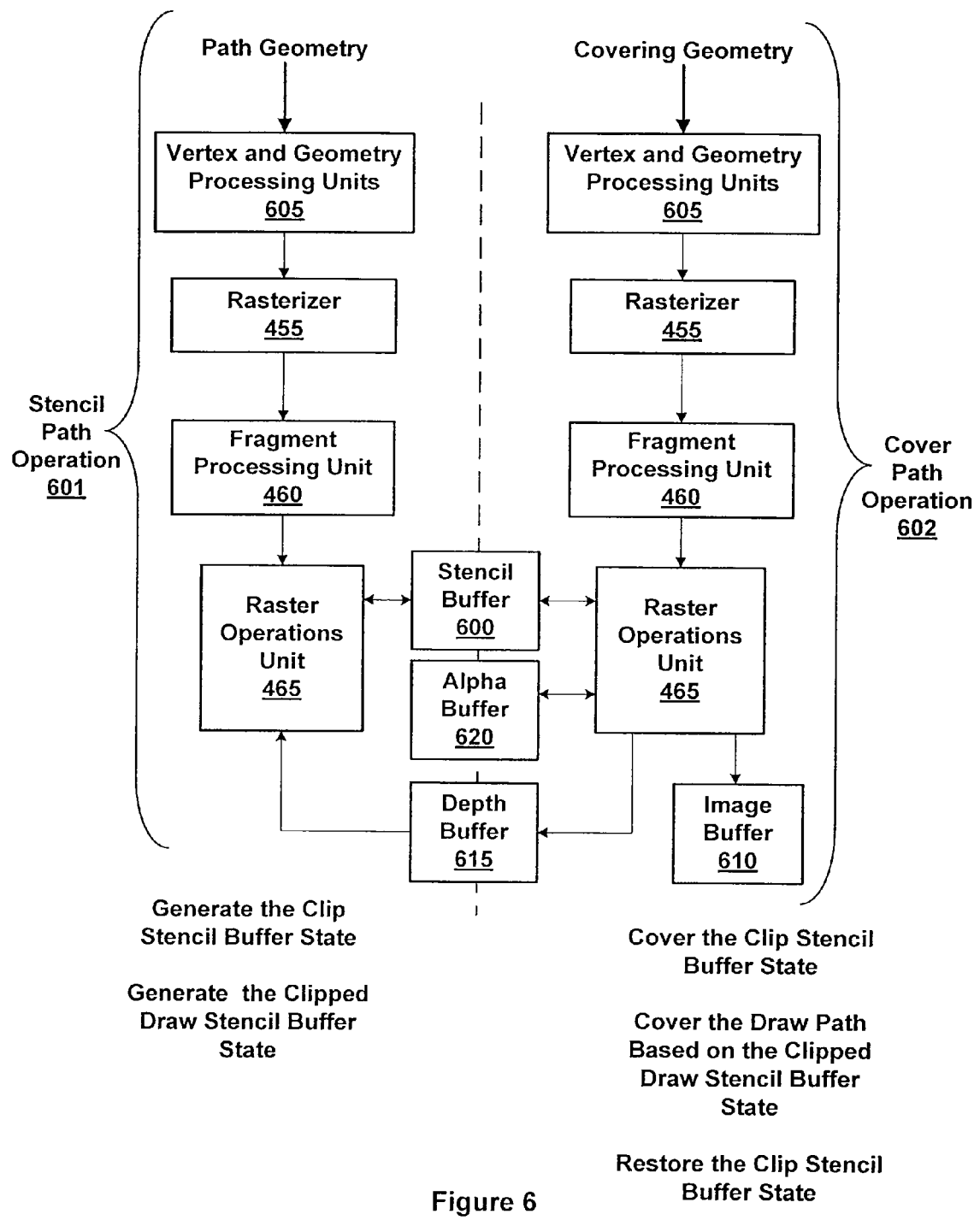
FIG. 6 is a conceptual diagram of a graphics processing pipeline that one or more of the PPUs of FIG. 2B can be configured to implement when rendering paths clipped by another arbitrary path, according to one embodiment of the invention.

FIG. 6 is a conceptual diagram of a graphics processing pipeline that one or more of the PPUs 202 of FIG. 2B can be configured to implement when filling and/or stroking paths using the two-step technique, according to one embodiment of the invention. The path geometry for filling or stroking a rendered path is input to a vertex and geometry processing units 605.

As previously explained, the path geometry is resolution-independent meaning that the filled or stroked and clipped or masked path can be rasterized under arbitrary projective transformations without needing to revisit the construction of the path geometry. This resolution-independent property is unlike geometry sets built through a process of tessellating curved regions into line segments; in such circumstances, sufficient magnification of the filled path would reveal the tessellated underlying nature of such a tessellated geometry set. Additionally, the path geometry is compact meaning that the number of bytes required to represent the filled or stroked path is linear with the number of path segments in the original path. This property does not generally hold for tessellated versions of filled paths where the process of subdividing curved edges and introducing tessellated triangles typically bloats out the resulting geometry set considerably.

The vertex and geometry processing units 605 may include one or more of the data assembler 410, the vertex processing unit 415, the primitive assembler 420, the geometry processing unit 425, and the viewport scale, cull, and clip unit 450 shown in FIG. 4. The vertex and geometry processing units 605 may be configured to transform the path geometry (anchor and convex hull geometry for filling and end-cap, join, and conservative bounding hull geometry for stroking) into pixel space.

The 2D (x,y) position of each vertex in the path geometry set can be treated as a 3D (x,y,0) position (using zero for the z component) such that a linearly varying depth values may be generated after projective transformation, and then rasterized to produce per-sample depth values suitable for conventional depth testing during the stencil step, however only the stencil buffer (not the depth buffer) is written during the stencil step so all the depth test can do is discard the stencil update. Similarly depth values can be generated from the covering geometry. Covering geometry depth values can update the depth value when indicated by the prior step's stencil results, subject to depth testing. When depth testing paths in this manner, it is advantageous to apply a polygon offset to the depth values in the stencil step in order to disambiguate the depth values from previously rendered co-planar paths. This approach allows path rendering to mix advantageously with conventional 3D rendering in a manner unavailable to prior art for path rendering The rasterizer 455 performs coarse and fine rasterization to determine the sample coverage of the path geometry (pixel or sub-pixel samples). The rasterizer includes determination, when filling, of whether the primitive being rasterized is front- or back-facing. This determination may be used subsequently to determine whether to increment or decrement stencil values. When geometry for convex hull geometry and round end-caps is rasterized, the fragment processing unit 460 is configured to execute the discard shader to determine whether the rasterized fragments should be discarded. If a fragment is discarded, no further processing occurs; in particular, the fragment's stencil value is not disturbed. Geometry for anchor triangles, non-round join styles, and non-round end caps does not require a discard shader. Implementations may bypass the shader execution for such these primitives to improve rasterization performance and/or reduce overall power consumption.

The raster operations unit 465 performs stencil testing and, if configured, depth testing. No further processing or buffer update occurs for fragments that are discarded by the fragment processing unit 460, or which fail the stencil test, or which fail the depth test (if enabled). Deciding the stencil test may require reading stencil buffer 600; deciding the stencil test may require reading the depth buffer 615. If a fragment is not otherwise discarded, raster operations unit 465 performs stencil updates. To fill the path, the stencil values corresponding to samples in the stencil buffer may be incremented and decremented based on the front- or back-facing winding direction of the path geometry determined by rasterizer 455. Alternatively to fill the path, the stencil values corresponding to the samples in the stencil buffer may be inverted. To stroke the path, the values corresponding to samples in the stencil buffer are set to a designated stencil reference value when the sample is within the stroke region. The raster operations unit 465 writes the stencil buffer 600. Conventional operations to control rasterization are available during generation of the stencil buffer, e.g., clip planes, scissoring, depth offset, window ownership testing, and the like.

Covering geometry (geometry fully covering the path) is input to cover the path based on the stencil buffer. The vertex and geometry processing units 605 may be configured to transform the covering geometry into pixel space. Importantly, the same transform that was applied to the path geometry to generate the stencil buffer is applied to the covering geometry to cover the path. As described previously and as done for the stencil step, the covering geometry is transformed and rasterized to produce per-sample depth values that can be used for depth testing and to update the depth buffer. Similarly, the covering geometry for a mask path may produce per-sample opacity (alpha) values that are written to an alpha buffer 620.

The rasterizer 455 performs coarse and fine rasterization to determine the sample coverage of the covering geometry (pixel or sub-pixel samples). The raster operations unit 465 is configured to perform stencil operations logically subsequent to shading operations (performed by the fragment processing unit 460). When covering the path, the raster operations unit 465 is configured to read the stencil buffer and use a stencil test to discard samples that are not inside of the path when filling or inside of the stroke region when stroking. When filling a path, rasterized samples having a corresponding stencil value in the stencil buffer 600 that is equal to the neutral value (value that is typically used to clear the stencil buffer) are discarded by the stencil test performed by the raster operations unit 465. The neutral value is written to the stencil buffer 600 after the corresponding stencil value is read. When stroking a path, samples having a corresponding stencil value in the stencil buffer 600 that are not equal to the reference stencil value (typically the value that is written to the stencil buffer for samples that are within the stroke region during the stencil step) are discarded.

The neutral value is written to the stencil buffer 600 after the corresponding stencil value is read. After all of the covering geometry has been stencil tested, all of the values in the stencil buffer 600 have been reset to their neutral value except for samples of a clip stencil buffer that were not inside of the draw path. The covering geometry for the clip path is rasterized to write the neutral value to all of the stencil values in the clip stencil buffer, i.e., to restore the clip stencil buffer.

When the two-step technique is used to render of a sequence of paths, the stencil is reset as the stencil is applied to the covering geometry. Clearing every sample in a stencil buffer as a separate operation can be expensive, so performing the clear as part of the path covering operation is advantageous. This approach to resetting stencil values in stencil buffer 600 to their neutral state also ensures color values in image buffer 610 are updated once-and-only-once per rendering of a given path, consistent with standard path rendering behavior. Optionally color writes to image buffer 610 may be disabled during the cover operation; indeed, when clipping (but not masking), color buffer writes are disabled so the stencil clip buffer state can be transferred to a stencil mask bit in the stencil buffer.

The fragments to be filled or stroked are shaded by the fragment processing unit 460. Standard path rendering modes are available during covering of the path, e.g., constant color, linear gradients, radial gradients, and the like. Advantageously, the fragment processing unit 460 can perform arbitrary programmable shading computations, matching those available to 3D rendering such as texturing, bump mapping, noise generation, and shadow mapping. When a draw path is masked, opacity values for the mask path stored in the alpha buffer 620 are used to blend the fill color of the masked draw path with the existing frame buffer contents. Alternatively, the opacity values may be stored in another unused component of the image buffer 610 or another buffer. Although the alpha buffer 620 is shown in FIG. 6 as a buffer that is separate from the image buffer 610, the alpha component may be stored as part of the image buffer 610 along with the color components.

The raster operations unit 465 writes the image buffer 610 and may also be configured to write depth values computed by the rasterizer 455 and/or fragment processing unit 460 to a depth buffer 615 and perform depth testing. When consistent with the order of operations described, an implementation may advantageously perform the stencil and/or depth tests normally performed by the raster operations unit 465 prior to shading operations performed by fragment processing unit 460. This reordering is not possible if the fragment shader might discard fragments or compute an alternative depth value to be used for depth testing. Conventional operations to control rasterization are available while rendering the covering geometry, e.g., clip planes, scissoring, depth offset, window ownership testing, and the like.

Path Clipping and Masking Optimizations

When the clip stencil buffer state is generated using the even-odd fill rule, the most-significant bit of the stencil buffer (i.e., the clip stencil buffer state) can be inverted in the first "stencil clip" step. The single resulting coverage bit value generated by the even-odd fill rule is generated directly into the most-significant bit of the stencil buffer. This eliminates the need for the second "cover clip" step that would normally transfer the coverage state in the lower bits of the stencil buffer (i.e., in the path cover stencil buffer state) to the clip stencil buffer state (i.e., most-significant bit of the stencil buffer).

The "cover clip" operation can similarly be eliminated when the rendered clip path is a stroked region rather than a filled region. When the clip path is a stroked region, the stroked coverage can simply replace the most-significant bit of the stencil buffer. Again, the "cover clip" step is unnecessary because the coverage is generated directly into the most-significant bit of the stencil buffer.

With these two optimizations, one step is removed from the processing sequence for rendering a clipped path, and the resulting sequence becomes "stencil clip, stencil draw, cover draw, then cover clip."

When a plurality of draw paths are to be clipped by the same clip path, rather than performing the "stencil clip" and "cover clip" steps for each one of the draw paths, the clip stencil buffer state for the clip path can be while each of the draw paths are rendered. In this case, the "cover draw" step would preserve the clip stencil buffer state by masking stencil writes to not include the most-significant bit of each stencil value in the stencil buffer. The following OpenGL commands may be used to prevent the clip stencil buffer state from being restored, where 0x0 is a reference value, the first 0x7F is a read mask, and the second 0x7F is a write mask:

```
glStencilFunc(GL_NOTEQUAL, 0x0, 0x7F);
glStencilOp(GL_KEEP, GL_KEEP, GL_ZERO);
glStencilMask(0x7F);
```

The important difference compared with the prior "cover draw" step that covers the clipped draw path is that the write mask does not include the most-significant bit, so the clip stencil buffer state is not changed (restored).

When the clip path clips multiple draw paths, 4n steps are needed to draw n clipped paths when the clip stencil buffer state is restored for each draw path compared with needing only 2n+3 steps when the clip stencil buffer state is only restored after all of the n clipped draw paths are rendered. When the "cover clip" step is also eliminated, only 2n+2 steps are needed to render n clipped draw paths.

Masking a draw path requires writing opacity values during the first "cover mask" step. This also means that this "cover mask" step cannot be eliminated in appropriate circumstances as can be done in the optimized cases discussed for clipping. When masking, the "cover draw" step uses blending operations to cover the masked draw path (assuming the mask opacity is stored in the framebuffer's destination alpha component). Alternatively, a mask opacity buffer is bound as a texture, the opacity corresponding to the sample being shaded is read from this mask opacity buffer, and the fill color of the draw path is modulated with the mask opacity.

When several draw paths are all rendered with the same mask path, the coverage and opacity of the mask path can be rendered once into the stencil and alpha buffer, respectively, and then used to render for each masked draw path. Because the mask path functions in a similar manner to the clip path, masking may be performed by using the clip stencil buffer state as a mask stencil buffer and writing an alpha buffer when the clip stencil buffer state is covered.

Hierarchical Path Clipping and Masking

Path clipping and masking can be applied to clip paths and mask paths that are arranged into a hierarchy. For example, a draw path may be clipped to a porthole and then the clipped draw path that is visible through that porthole may be clipped by a doorway. The content within the doorway should only be visible for the region of the doorway visible through the porthole.

In an artistic context, an artist might author an object containing a path that was clipped by a clip path. This object may itself be cut-and-pasted into a larger scene and the complete object may be clipped or masked. In both these situations, clipping and masking operate through a hierarchy of clipping and masking paths. Rather than simply use the most-significant bit of the stencil buffer to store the clip (or mask) stencil buffer, each successively deep clip path or mask path can use successively less significant bits of the stencil buffer. For example, the porthole could use the most significant bit (0x80) for clipping to the porthole while the doorway could use the next most significant bit (0x40) for clipping to the doorway.

The advantage of this approach is that multiple objects at the same level of the clip/mask hierarchy can use the same coverage information established by the clip/mask path corresponding to that level of the hierarchy. However, each nested clipping/masking consumes a bit of the stencil buffer, and in the case of the non-zero counting rule, the chance that a winding number might alias with the neutral value is increased, and incorrect stencil values may be generated. Additionally, the hierarchical nesting cannot descend beyond n−1 where n is the number of available stencil bits. Finally, in the case of nested masking, there must be an opacity buffer for each level of masking and these multiple opacities must be multiplied together.

Most nesting hierarchies for clipping/masking paths are not very deep and nested masking is particularly uncommon, so in practice the limitations presented by a clip/mask hierarchy are not typically encountered. Even in these circumstances, when clip/mask paths are deeply nested, multiple clip/mask paths may be collapsed into a single bit at the cost of rendering the deeper clip/mask paths more frequently.

Other Boolean Region Operations for Path Rendering

The clipping and masking operations described intersect the sample coverage indicated by the clip stencil mask with the draw path, and modulate the opacity of the intersection in the case of masking. Other Boolean operations may be performed using the stencil testing to render regions such as union, subtraction, and symmetric differences of two paths. For example, for subtracting the clip path from the draw path, an application would make sure to not cover pixels where the clip path had set the most-significant bit of the stencil buffer. In other words, only cover samples where the winding number satisfies the draw path's fill rule and the most-significant bit of the stencil buffer is zero. This can be configured with the following OpenGL command in the "stencil draw" step, where 0x0 is a reference value, and 0x80 is a read mask, and 0x7F is a write mask for the path stenciling command:

glPathStencilFuncNV(GL_EQUAL, 0x00, 0x80);

Configuring the stencil testing in this manner ensures that the winding number is only counted for samples not within the clip path. The difference between this configuration and the "stencil draw" stencil configurations presented previously, is the reference-value is 0x00 (instead of 0x80). When performing masking using Boolean operations, the effective opacity for each sample must be properly computed. For example, subtraction needs to modulate the fill color by 1-α, e.g., one minus the opacity of the mask path.

Figure 7:
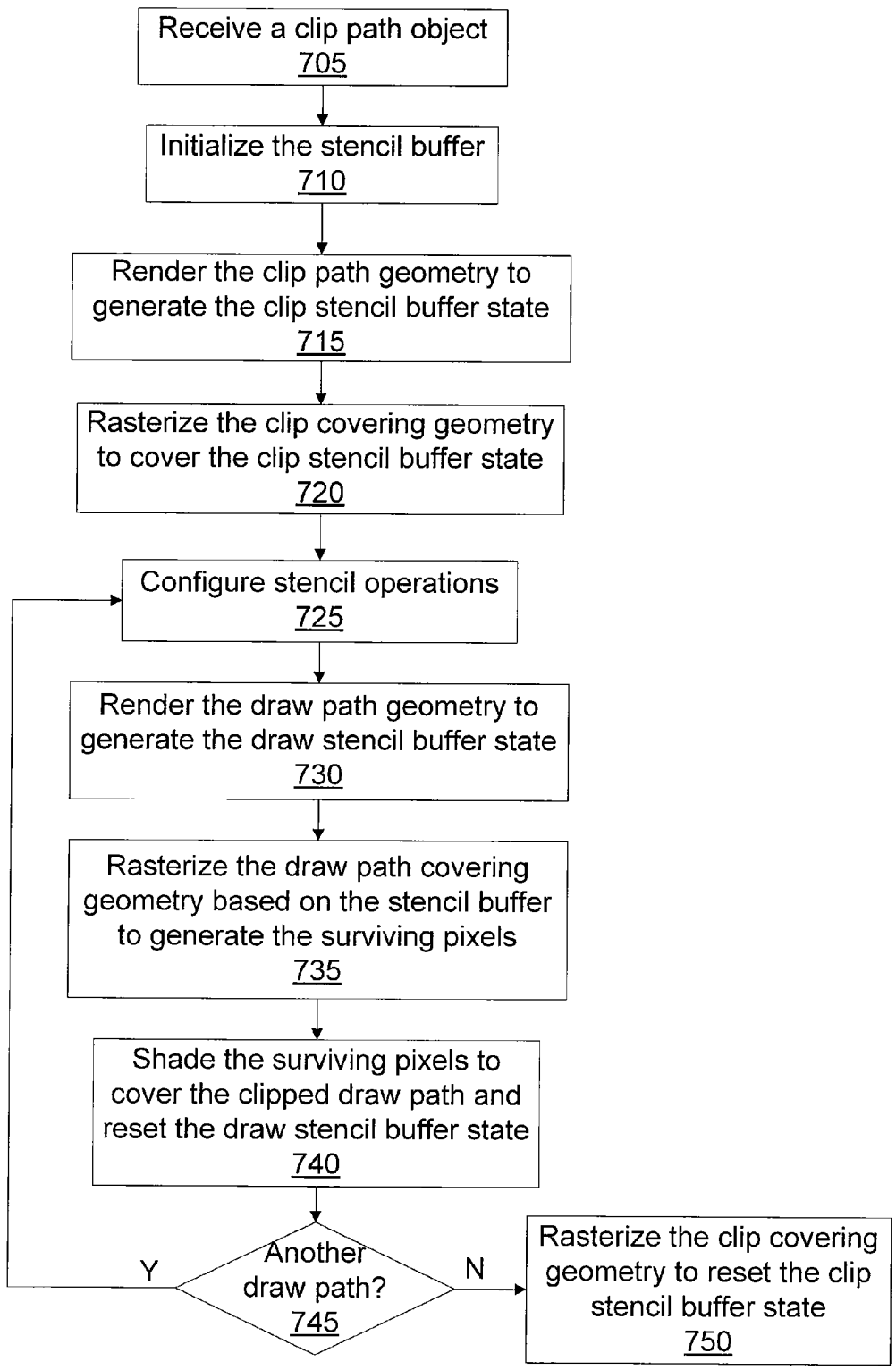
FIG. 7 is a flow diagram of method steps for rendering paths that are clipped or masked, according to one embodiment of the present invention.

FIG. 7 is a flow diagram of method steps for rendering paths that are clipped or masked, according to one embodiment of the present invention. Although the method steps are described in conjunction with the systems of FIGS. 2A, 2B, 3A, 3B, 3C, 4, and 6, persons skilled in the art will understand that any system configured to perform the method steps, in any order, is within the scope of the invention. The CPU 102 or parallel processing subsystem 112 may be configured to render paths.

At step 705 a path object for a clip path is received. At step 710 the stencil buffer 600 is initialized to clear the clip stencil values (indicate that all samples are visible) and the path cover stencil values to neutral values. At step 715 the specification of the clip path including the clip path geometry is provided to one or more of the PPUs 202 or another processor and the clip path geometry are rendered to generate a clip path cover buffer within stencil buffer 600 indicating samples that are covered by the clip path. More specifically, the clip path cover stencil values in the stencil buffer are computed. At step 720 the clip covering geometry is rasterized to cover the clip path cover stencil buffer state and generate the clip stencil buffer state that is included in the stencil buffer. When masking is used, opacity values for the mask path are written to the alpha buffer. Step 720 is not performed when the clip stencil buffer state is generated directly at step 715.

At step 725 the stencil operations are configured to discard samples based on the clip stencil buffer state. At step 730 the draw path geometry is rendered with stencil testing enabled to generate the clipped draw path stencil buffer state. At step 735 the draw path covering geometry is rendered with stencil testing enabled to determine surviving pixels that are covered by the clipped draw path based on the clipped draw path stencil buffer state included in the stencil buffer 600. The stencil testing will discard any pixels that are not covered by both the draw path and the clip path.

At step 740 the surviving pixels are shaded to cover the clipped draw path, producing a rendered image of the clipped draw path. The rendered image may illustrate the clipped draw path with stroking and/or filling. At step 740 the clipped draw stencil buffer state is also cleared to the neutral value. Step 745 determines if another clipped draw path will be rendered, and, if not, at step 750 the clip covering geometry is rasterized to clear the clip stencil buffer state to the neutral value. Otherwise, the shader program returns to step 725, and the clip stencil buffer state is retained to clip another draw path.

The two-step path rendering technique of "stencil, then cover" path rendering turns the path rendering problem into a rasterization problem at which CPUs are exceedingly efficient. The stencil buffer is used to maintain opacity state in addition to path coverage information to clip a drawn path to another arbitrary path. The stencil buffer includes clipped draw stencil buffer state indicating coverage for each individual draw path that is clipped by a clip path and a clip stencil buffer state indicating pixels inside of the clip path. The clip stencil buffer state may be separately applied to different draw paths to generate respective clipped draw stencil buffer states. Regions of filled or stroked draw paths can be clipped by using the clip stencil buffer state. Regions of filled or stroked draw paths can be masked when an opacity value, e.g., alpha, is stored for each stencil buffer value. More generally Boolean combinations may be applied by the clip stencil buffer state during stencil testing so that unions, intersections, or differences of the clip path and the draw path can be performed and the resulting region can be shaded.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD- ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of rendering clipped paths, the method comprising:
   receiving a clip path and a draw path to be clipped by the clip path;
   generating, by rendering clip path geometry, a clip stencil buffer state indicating samples that are inside of the clip path;
   generating, by rendering draw path geometry, clipped draw path stencil buffer state indicating samples of the draw path to be covered, wherein a stencil test applies the clip stencil buffer state to rasterized samples of the draw path geometry to update stencil values of the clipped draw path stencil buffer state;
   determining, during rendering of draw path covering geometry with stencil testing enabled, surviving pixels that are covered by the draw path and the clip path based on the clipped draw path stencil buffer state; and
   shading the surviving pixels to produce a rendered image of the draw path clipped by the clip path.

2. The method of claim 1, further comprising:
   receiving a second draw path that to be clipped by the clip path; and
   generating, by rendering second path geometry, a clipped second draw path stencil buffer state indicating samples of the second draw path to be covered based on the clip stencil buffer state.

3. The method of claim 2, further comprising:
   determining, during rendering of second path covering geometry with stencil testing enabled, surviving pixels that are covered by the second path and the clip path based on the clipped second path stencil buffer state; and
   shading the surviving pixels to produce a rendered image of the second draw path clipped by the clip path.

4. The method of claim 1, further comprising restoring the clip stencil buffer state to neutral values by rendering the clip path covering geometry.

5. The method of claim 1, wherein the draw path is clipped by the clip path according to a Boolean operation represented by the stencil test.

6. The method of claim 1, wherein the clip stencil buffer state comprises a most significant bit stored for each sample in a stencil buffer including the clip stencil buffer state and the clipped draw path stencil buffer state.

7. The method of claim 1, wherein the generating of the clip stencil buffer state comprises generating a clip path cover stencil buffer state that indicates samples covered by the clip path during rendering of the clip path geometry, and further comprising rendering clip path covering geometry with stencil testing enabled to write stencil values to the clip stencil buffer state based on the clip path cover stencil buffer state.

8. The method of claim 1, further comprising writing a neutral value to each stencil value that is read from the draw path stencil buffer state when determining the surviving pixels.

9. The method of claim 1, wherein the shading of the surviving pixels comprises blending the surviving pixels using an alpha buffer storing opacity values of a mask path.

10. The method of claim 1, wherein determining the surviving pixels includes discarding rasterized samples having a corresponding stencil value in the stencil buffer that is equal to a neutral value.

11. The method of claim 1, further comprising, prior to generating the clip stencil buffer state and generating the draw path stencil buffer state, initializing stencil values of the clip stencil buffer state and the draw path stencil buffer state to neutral values.

12. The method of claim 1, wherein the generating of the clip stencil buffer state includes writing opacity values of a mask path to an alpha buffer.

13. A system for rendering clipped paths, the system comprising:
   a memory that is configured to store a stencil buffer that includes clipped draw path stencil buffer state and clip stencil buffer state; and
   a processor that is coupled to the memory and configured to:
      receive a clip path and a draw path to be clipped by the clip path;
      generate, by rendering clip path geometry, the clip stencil buffer state that indicates samples that are inside of the clip path;
      generate, by rendering draw path geometry, the clipped draw path stencil buffer state that indicates samples of the draw path to be covered, wherein a stencil test applies the clip stencil buffer state to rasterized samples of the draw path geometry to update stencil values of the clipped draw path stencil buffer state;
      determine, during rendering of draw path covering geometry with stencil testing enabled, surviving pixels that are covered by the draw path and the clip path based on the clipped draw path stencil buffer state; and
      shading the surviving pixels to produce a rendered image of the draw path clipped by the clip path.

14. The system of claim 11, wherein the processor is further configured to restore the clip stencil buffer state to neutral values by rendering the clip path covering geometry.

15. A non-transitory computer-readable storage medium storing instructions that, when executed by a processor, cause the processor to render clipped paths, by performing the steps of:
   receiving a clip path and a draw path to be clipped by the clip path;
   generating, by rendering clip path geometry, clip stencil buffer state indicating samples that are inside of the clip path;
   generating, by rendering draw path geometry, clipped draw path stencil buffer state indicating samples of the draw path to be covered, wherein a stencil test applies the clip stencil buffer state to rasterized samples of the draw path geometry to update stencil values of the clipped draw path stencil buffer state;
   determining, during rendering of draw path covering geometry with stencil testing enabled, surviving pixels that are covered by the draw path and the clip path based on the clipped draw path stencil buffer state; and shading the surviving pixels to produce a rendered image of the draw path clipped by the clip path.

16. The non-transitory computer-readable storage medium of claim 15, further comprising restoring the clip stencil buffer state to neutral values by rendering the clip path covering geometry.

17. The non-transitory computer-readable storage medium of claim 15, wherein the draw path is clipped by the clip path according to a Boolean operation represented by the stencil test.

18. The non-transitory computer-readable storage medium of claim 15, wherein the clip stencil buffer state comprises a most significant bit stored for each sample in a stencil buffer including the clip stencil buffer state and the clipped draw path stencil buffer state.

19. The non-transitory computer-readable storage medium of claim 15, wherein the generating of the clip stencil buffer state comprises generating a clip path cover stencil buffer state that indicates samples covered by the clip path during rendering of the clip path geometry, and further comprising rendering clip path covering geometry with stencil testing enabled to write stencil values to the clip stencil buffer state based on the clip path cover stencil buffer state.

20. The non-transitory computer-readable storage medium of claim 15, further comprising writing a neutral value to each stencil value that is read from the draw path stencil buffer state when determining the surviving pixels.

\* \* \* \* \*